Nov. 10, 1959 A. R. MAXEY 2,912,518

MAGNETIC TAPE APPARATUS

Filed Jan. 24, 1956 4 Sheets-Sheet 1

INVENTOR.
Alexander R. Maxey
BY
Flehr and Swain
ATTORNEYS

Nov. 10, 1959 A. R. MAXEY 2,912,518
MAGNETIC TAPE APPARATUS
Filed Jan. 24, 1956 4 Sheets-Sheet 2

INVENTOR.
Alexander R. Maxey
BY
Fliehr & Swain
ATTORNEYS

Nov. 10, 1959 A. R. MAXEY 2,912,518

MAGNETIC TAPE APPARATUS

Filed Jan. 24, 1956 4 Sheets-Sheet 3

INVENTOR.
Alexander R. Maxey
BY
Flehr & Swain
ATTORNEYS

Nov. 10, 1959 A. R. MAXEY 2,912,518

MAGNETIC TAPE APPARATUS

Filed Jan. 24, 1956 4 Sheets-Sheet 4

INVENTOR.
*Alexander R. Maxey*
BY
*Flehr and Swain*
ATTORNEYS

United States Patent Office 2,912,518

Patented Nov. 10, 1959

2,912,518

MAGNETIC TAPE APPARATUS

Alexander R. Maxey, Redwood City, Calif., assignor to Ampex Corporation, Redwood City, Calif., a corporation of California Application January 24, 1956, Serial No. 561,053

12 Claims. (Cl. 179—100.2)

This invention relates generally to electromagnetic tape apparatus, and particularly to apparatus for use in systems for recording and/or reproducing signal intelligence over a wide frequency spectrum, including for example, video frequencies.

In copending application Serial No. 524,004, filed July 25, 1955, for "Broad Band Magnetic Tape System and Method," there is disclosed a system making use of a rotary head assembly for recording and/or reproducing signals over a wide frequency spectrum. One practical use for such a system is the recording and reproduction of television programs. The head assembly disclosed in said application comprises a plurality of transducer units that are mounted to rotate and to sweep transversely across a magnetic tape. Special speed control means is employed for driving the head assembly and the magnetic tape during recording, and to insure accurate tracking and synchronization for playback operations. It will be evident that each sweep of a transducer unit across the tape forms a portion of the record track, and that such successive sweeps must be reproduced and combined in accurate sequence for playback. As disclosed in said application 524,004, some distortion may be caused in playback due to overlap between the successive sweep paths of the transducer units. Therefore it is desirable to utilize switching means in the reproducing electronics, whereby portions of the tracks having duplicate recording are effectively eliminated in reproducing the final signal.

In general it is an object of the present invention to provide apparatus of the above character which avoids the use of switching in the playback or reproduction electronics.

Another object of the invention is to provide an apparatus of the above character which in some respects is simpler than the rotary recording and reproducing head disclosed in said copending application 524,004, particularly in that it makes possible the use of a single transducer head.

Another object of the invention is to provide apparatus of the above character which makes possible simplification of the reproducing electronics.

Additional objects and features of the invention will appear from the following description in which the preferred embodiments have been shown in detail in conjunction with the accompanying drawing.

Referring to the drawing.

Figure 1:
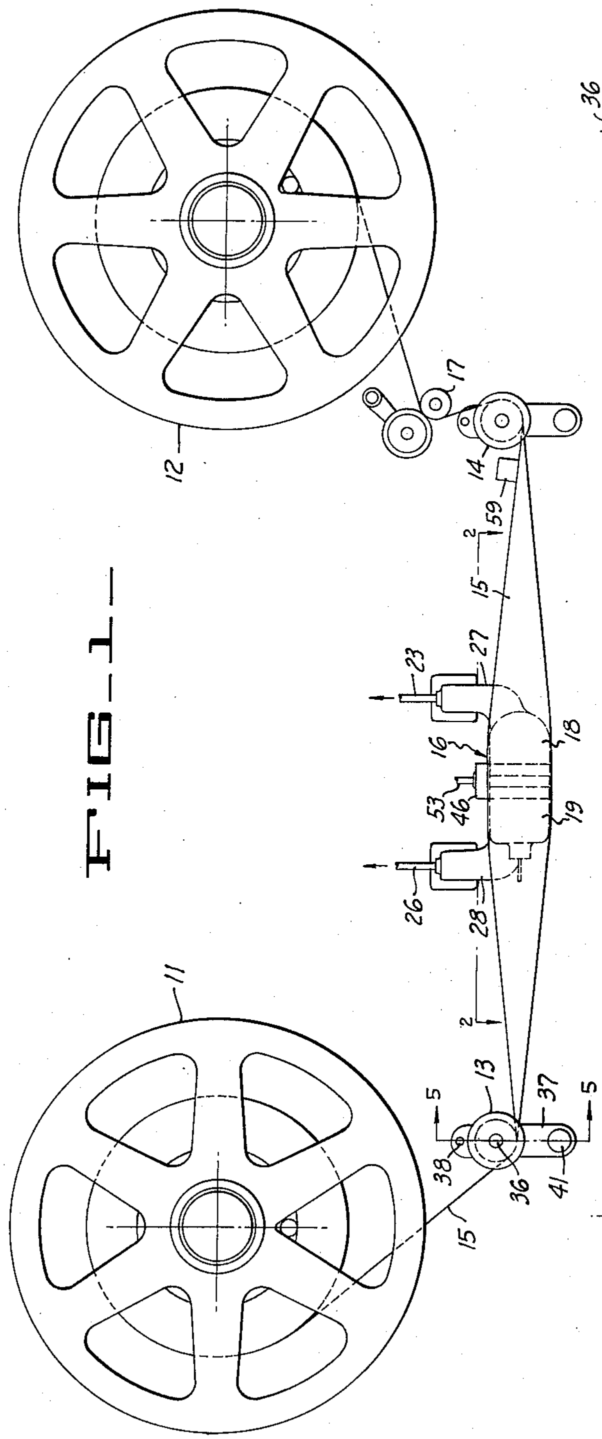
Figure 1 is a plan view illustrating one embodiment of the invention.

The tape transport apparatus illustrated schematically in Figure 1 consists of supply and takeup reels 11 and 12, which are carried by suitable turntables.

In accordance with customary practice a suitable motor is provided for the turntable associated with reel 11, to apply torque whereby a constant tape tension is maintained during recording or playback operations. Also this motor can be used for rewind operations. Another motor is associated with the turntable for reel 12, to apply constant tension for tape takeup and fast forward operation. Guide rollers 13 and 14 are disposed to engage the tape 15 at spaced distances from head assembly 16. The tape also engages a driving capstan 17 that is driven by a suitable motor of controlled speed. The tape employed is of substantial width compared to tape used with conventional magnetic equipment, and for example may have a width of the order of four inches. Its construction can be similar to magnetic tape now available on the market for sound recording, and it can consist of a pliable strip of plastic material such as cellulose acetate, having a thin coating of magnetic material on one side of the same.

Figure 3:
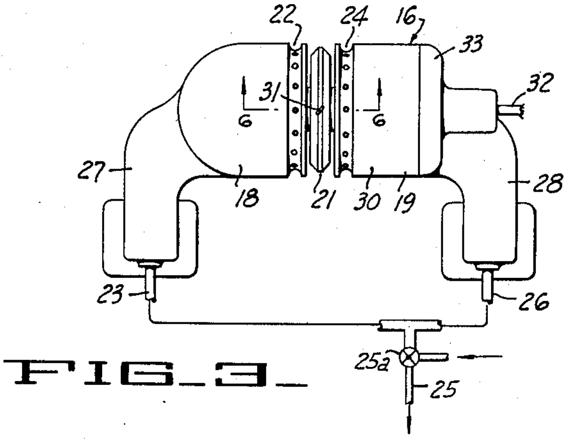
Figure 3 is an enlarged plan view illustrating the tape forming means and associated parts.
Figure 4:
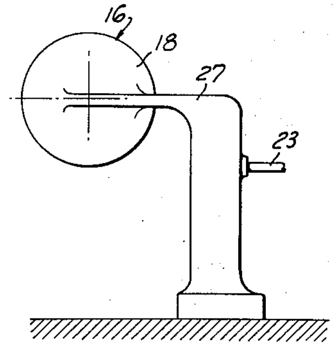
Figure 4 is an end view of the forming means illustrated in Figure 3.

As shown in Figure 3 the head assembly can consist of stationary parts 18 and 19, together with the rotary part 21. As will be presently explained in greater detail, the rotary part carries a transducer unit that sweeps across the coated side of the tape. Both the parts 18 and 19 are circular in section. The end portion of part 18 close to the rotary part 21, is provided with an annular groove 22, that is connected by ducts *22a*, leading to a suction or vacuum line 23. The part 19 similarly is provided with a groove 24, connected by ducts *24a* to the vacuum line 26. As will presently be explained, application of a partial vacuum to these grooves serves to hold a tape against the parts 18 and 19, while the tape is being moved in the direction of its length by the driving capstan 17. As simple means for permitting an adjustment of the applied vacuum, I have shown the two lines 23 and 26 connected to a common line 25 (Figure 3) that extends to a suitable vacuum pump, together with a small adjustable bleed valve 25a whereby air can be bled into the system to regulate the vacuum as desired. Both the parts 18 and 19 are shown carried by the rigid supporting arms 27 and 28, which in turn are secured to a suitable mounting panel or other support.

The part 21 can be in the form of an arm or wheel provided with a transducer unit 29. The tip 31 of this transducer unit projects a short distance from the periphery of the wheel, and is formed to engage and sweep across the tape.

The part 19 may serve to house and mount a motor 30 of the alternating current synchronous type, and the shaft 30a of this motor can be directly secured to the wheel 21.

The transducer unit can be of the type commonly used in connection with magnetic tape machines. For example it can consist of a magnetic core provided with a winding and with suitable pole tips of hard wear-resisting metal separated by a thin shim of nonmagnetic metal to thereby form a magnetic gap.

One lead from the winding of the transducer unit can be grounded, and the other extended through slip ring means, which likewise may be contained or housed within the part 16. The lead 32 from the slip ring means connects with the recording and/or reproducing electronics. The part 33 (Figure 3) can be a pulse generator driven by the motor shaft, and may for example be of the photoelectric type as disclosed in copending applications 427,138 filed May 3, 1954; 506,182 filed May 5, 1955, and Ginsburg, et al., filed on or about December 13, 1955 (Flehr and Swain file 14746). Such a generator can be used in a speed control system in the manner disclosed in the copending applications just mentioned.

Figure 5:
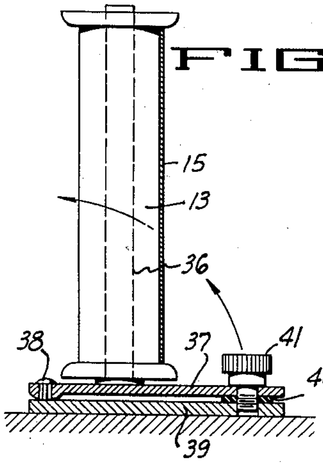
Figure 5 is an enlarged cross-sectional view taken along line 5—5 of Figure 1.

The guide rollers 13 and 14 are disposed on substantially parallel axes at right angles perpendicular to the lighter centers of the parts 18, 19 and 21. For a purpose to be presently described it is desirable for at least one of these rollers to be mounted in such a manner that it can be adjusted angularly about the axis of parts 18 and 19. A suitable mounting for this purpose is shown in Figure 5. Thus roller 13 in this instance is journaled to the stud shaft 36, which in turn is secured to the plate 37. One end of plate 37 is secured as by means 38, to the base plate 39, whereby plate 37 can be raised or lowered a limited amount. Adjusting screw 41 engages the other end of plate 39, thereby permitting manual adjustment to the position desired. Plate 37 is urged in one direction by suitable yielding means, such as the pad 42 of resilient rubber. It will be evident that the adjusting means permits the upright axis of the roller 13 to be tilted as indicated in Figure 5, and this in turn has the effect of changing the angular positioning about the axis of the parts 18 and 19.

Figure 6:
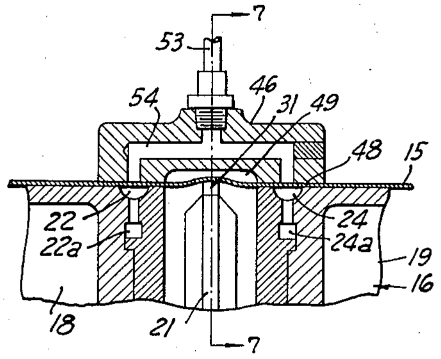
Figure 6 is an enlarged cross-sectional view illustrating the retention of the tape upon the forming means and also illustrating the means for preventing rotation of the tape.
Figure 9:
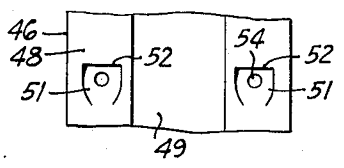
Figure 9 is an enlarged detail illustrating the means for preventing rotation of the tape.

It is desirable to provide means serving to prevent any rotation of the cylindrical portion of the tape in the same direction as the direction of rotation of the transducer unit. The means illustrated for this purpose consists of a block 46 carried by the arm 47. The side face 48 of this block is formed substantially as a segment of a cylinder, the radius of which corresponds substantially to the distance from the axis of rotation of the transducer unit, to the exterior surface of the tape. The curved face 48 is interrupted by the groove 49 (Figures 6, 7 and 9) having a width corresponding substantially to the spacing between the parts 18 and 19. The curved surface 48 is also provided with shallow pockets 51 (Figure 9) of tapered depth which have their ends of greatest depth terminating with the shoulders or ledges 52. In general the pockets 51 are of gradually increasing depth, and at the shoulders 52 the depth should be slightly greater than the thickness of the magnetic tape.

Provision is made for applying a partial vacuum to the pockets 51, whereby in the regions of these pockets the margin 15a of the tape is drawn therein, to cause the edge of the tape to abut the shoulders 52. Thus a suction line 53 is shown connected to the block, and the block is provided with ducts 54, whereby the line 53 is placed in communication with the pockets 51.

Figure 7:
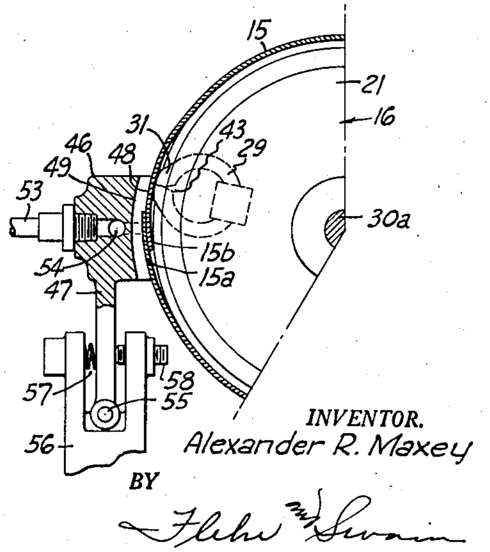
Figure 7 is a cross-sectional detail taken along the line 7—7 of Figure 6.

A suitable mounting is provided for the block 46 whereby it can be properly positioned adjacent the magnetic tape. Thus as shown in Figure 7 the lower end of the arm 47 has a pivotal connection 55 with the supporting base 56. A spring 57 serves to urge the block in a direction toward the tape, and a set screw 58 can be adjusted whereby the block is held in a desired position. Normally the block is adjusted whereby its curved surface 48 is in close proximity to the tape, without however offering any substantial resistance to movement of the tape across the parts 18 and 19.

Figure 2:
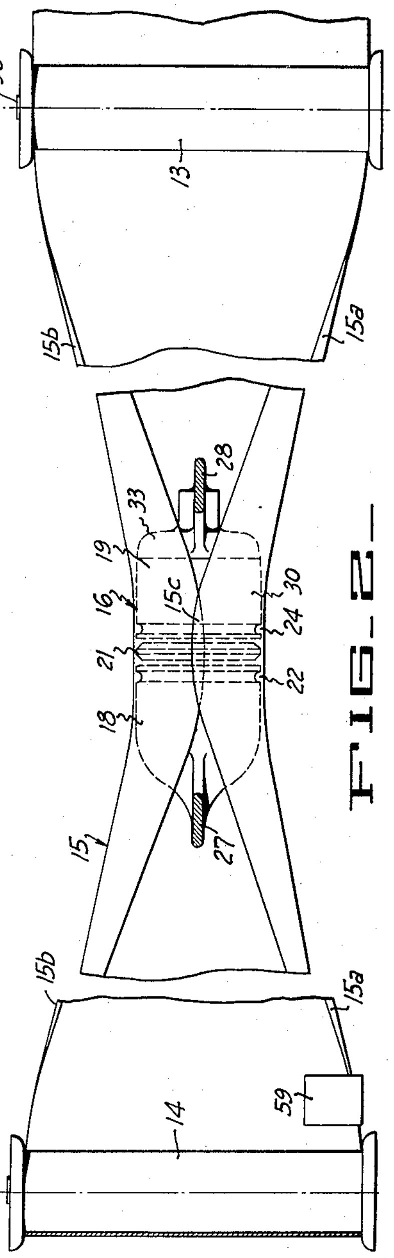
Figure 2 is an enlarged detail illustrating the tape forming means and associated parts, and taken in the direction illustrated in Figure 1.

Operation of the apparatus described above is as follows: The tape 15 is threaded in the manner illustrated in Figure 1 and is wrapped about the parts 18 and 19 as shown in Figure 2. Note that the margins or longitudinal edges 15a and 15b are in overlapping relation as shown in Figure 7. A constant partial vacuum is continuously applied to the grooves 22 and 24 to hold the tape in contact with the parts 18 and 19, and in particular to hold that portion 15c which passes between the parts 18 and 19, in the form of a cylinder. The dimensioning is such that the tip 31 of the transducer unit presses outwardly against the tape whereby when the part 21 is rotated, while the tape is progressing in the direction of its length, the tip of the transducer unit sweeps across successive track areas on the magnetic tape. By properly correlating the velocity of feed of the tape, and the speed of rotation of the transducer unit, the sweep areas or tracks upon the tape can be spaced a small distance in the direction of the length of the tape, thereby preventing interference between successive track areas.

It will be evident from Figure 7 that the margin 15a is not swept by the transducer unit, but because of the overlap a margin is provided along one edge of the tape which can be used for other purposes, such as recording of a control frequency for the motor speed control system, and for the recording of a sound track, where the system is being used for television recording and/or reproduction. In Figure 1 a magnetic head 59 is shown engaging margin 15a for such recording and/or playback operations.

Figure 8:
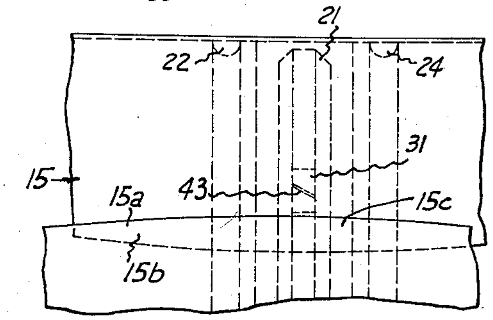
Figure 8 is an enlarged side elevational view illustrating the manner in which the tape is wrapped about the parts 18 and 19.

As illustrated particularly in Figure 8 it is desirable for the plane of the magnetic gap 43 of the transducer unit to be inclined at a substantial angle to the plane of rotation of the wheel. For example the gap 43 can be inclined at an angle ranging from 25 to 45° with respect to the plane of rotation. This feature facilitates continuity in the recording and/or reproduction while the transducer unit is passing across the edge of the margin 15b. It will be evident that as the magnetic gap passes across the edge of margin 15b, a part of the gap operates beyond the edge of the tape, while the remaining portion of the gap is operating on the area preceding the edge.

During operation of the machine it may be necessary to adjust the mountings for rollers 13 and 14. Adjusting the setting of one of these rollers with respect to the other has the effect of slightly displacing one margin 15a with respect to margin 15b, in the direction of the length of the tape. Such an adjustment may be desirable in reproducing operations to properly align the ends of the track areas for effective tracking of the transducer unit.

The means employed for engaging and forming an abutment shoulder for one edge of the tape, namely the block 46, serves to definitely locate the tape with respect to its angular position about the axis of the parts 18 and 19, and serves to prevent any rotation about this axis which might otherwise tend to occur due to the frictional drag of the transducer unit against the tape.

As explained in said copending application Serial No. 524,004, during recording the transducer unit is connected to suitable record electronics, which may apply signal energy. The sweep speed of the transducer unit is selected in accordance with the frequency spectrum to be recorded. For example when the frequency spectrum extends to say 4.5 megacycles, the sweep speed of the transducer unit may for example be of the order of from 100 to 200 feet per second for a tape speed of from about 5 to 10 inches per second.

For playback or reproduction the machine is operated in the same manner as described above, and the transducer unit is connected to suitable electronics for reproducing the original signal frequencies. The applied vacuum is adjusted by valve **25*a* whereby the tape tension in the region of gap 43** is such as to insure continuity of the record at the overlap between the edges of the tape. It may be explained that an increase in the applied vacuum increases the contact pressure between the tip of the transducer unit and the tape, and this in turn slightly increases stretching of the tape in the region of contact. This adjustment of the vacuum serves to adjust registration between the ends of adjacent track areas, in a circumferential direction.

Another embodiment of the invention is shown in Figures 10 to 17, inclusive. In this instance the magnetic tape engages the annular stationary parts 61 and 62, and the rotary part 63 which carries the transducer. The parts 61 and 62 are cylindrical shaped, and their remote ends are secured to the rigid support arms 64 and 66. A rigid bar 67 connects the arms 64 and 66, and is secured to a suitable support 68, such as a member on the top panel of the equipment. The tape from the supply reel passes about the guide stud or roller 69 that is carried by the spring urged compliance arm 70. From thence the tape passes over the guide rollers 71, and the tape play-out guide 72. This guide is in the form of a block having a tap engaging surface 73 that corresponds to the segment of a sphere or ellipsoid. The purpose of this block is to cup the tape a predetermined amount, before the tape proceeds to be bent into cylindrical form as it passes across the parts 61 and 62.

After leaving the part 62 the tape passes over a curved takeup guide 74 that is formed similar to the guide 72. Guide 74 likewise has a curved tape engaging surface 76 like the surface 73 of guide 72. After leaving the guide 74 the tape engages the driving capstan 77 that is driven by suitable motive means. An idler roller 78 presses the tape against the surface of the capstan 77 during recording or playback operations. A guide roller 79, similar to the roller 71, engages the tape leaving the capstan 77, and thereafter the tape passes over the guide stud 80, carried by the spring urged compliance arm 81, and then continues to the takeup reel.

At least one of the curved guides, as for example guide 72, is preferably provided with an adjustable mounting 82 formed similar to the mounting shown in Figure 5, and which permits one to adjust the position of this guide with respect to the vertical. The tip 83 of a transducer can be incorporated in the guide 74 for recording along a linear track area adjacent one edge of the tape. This guide can also serve to mount a transducer unit having a tip 84 located to operate along the longitudinal center line of the tape. As illustrated the magnetic gap of this transducer unit is inclined to the same angle as the magnetic gap of the unit carried by the rotating part 63. The last named transducer unit can be used for deriving a frequency usuable in the capstan motor speed control system.

Figures 14, 15, 16, 17:
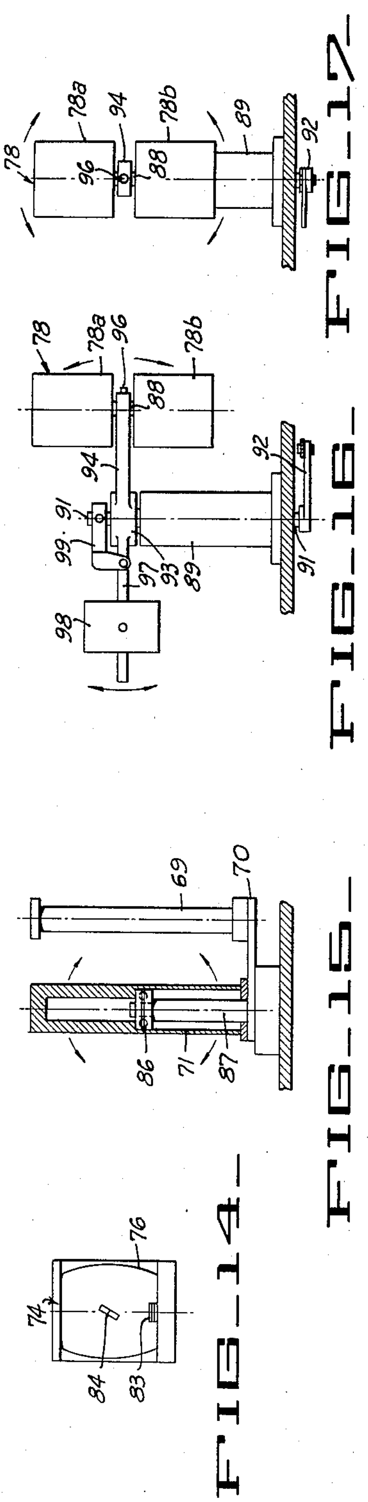
Figure 14 is a detail looking toward the tape engaging face of the tape guide 74.
Figure 15 is an enlarged detail in section taken along the line 15—15 of Figure 10.
Figure 16 is a side elevational view illustrating the idler means for pressing the tape against the driving capstan.
Figure 17 is an end view of the assembly shown in Figure 16.
Figures 11, 12, 13:
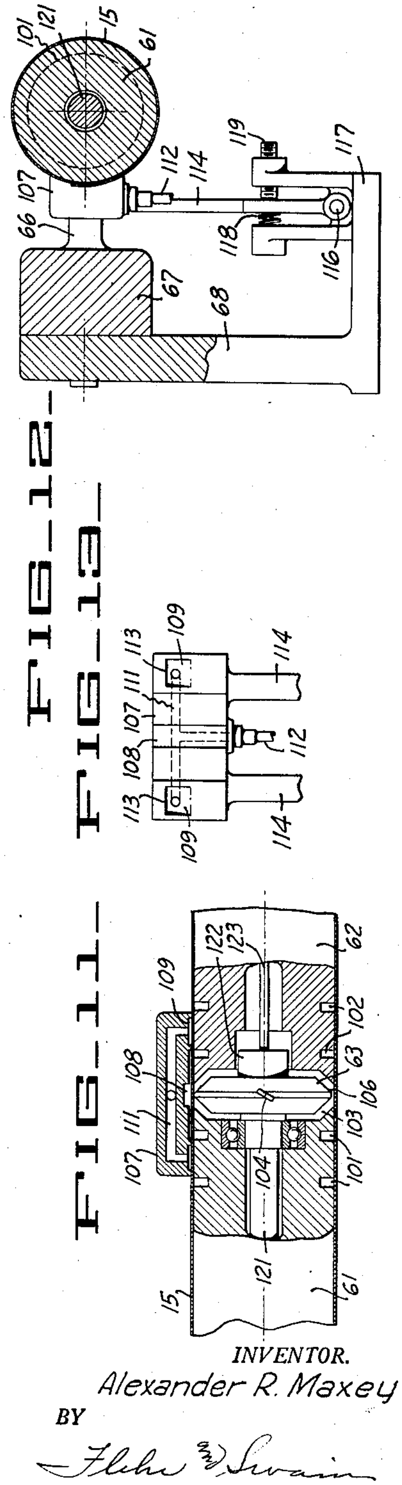
Figure 11 is an enlarged view partly in section illustrating the parts for forming the tape together with the transducer means and associated parts.
Figure 12 is a side elevational view in section on the same scale as Figure 11, and illustrating one of the parts for forming the tape into the shape of a cylinder.
Figure 13 is a detail looking toward the inner face of the block 107 of Figure 11.

It is desirable for both the guide rollers 71 and 79 to be capable of self-aligning action. Thus as illustrated in Figure 15, the guide rollers 71 and 79 can be provided with a centrally located bearing assembly 86 serving to journal the same to the inner supporting shaft 87. The bearing assembly 86 is such as to permit a limited tilting of the axis of rotation in any direction.

The idler roller can be constructed and mounted in the manner illustrated in Figures 16 and 17, to permit self-aligning action. Thus it is formed of upper and lower roller sections **78*a* and 78*b*, journaled upon the generally vertical shaft 88. A mounting 89 serves to journal the vertical shaft 91, the lower end of which is attached to the operating arm 92. A ball bearing assembly serves to journal a ring 93 to the upper end of shaft 91, and the assembly is such as to permit a limited amount of tilting of ring 93 in any direction. Arm 94 is attached to ring 93 and is provided with connection 96 to the shaft 88, whereby the roller sections 78*a* and 78*b* are free to swing a limited amount about the axis of arm 94, obtaining this freedom from the ball bearing at 93, as illustrated in Figures 16 and 17. A counterbalance arm 97, provided with the balancing weight 98, is attached to ring 93 and serves to counterbalance the weight of the roller sections 78*a* and 78*b* and associated parts. A torque arm 99 is attached to the shaft 91, and contacts the adjacent portion of arm 97, whereby the arms 94 and 97 and associated parts are rotated about a vertical axis, upon rotation of shaft 91. Arm 92 is connected to suitable operating means, such as a solenoid or the like, whereby during recording and playback operations the shaft 91** is urged in a clockwise direction as viewed in Figure 10.

The idler assembly and associated parts just described make for even pressure of the relatively wide tape upon the surface of the driving capstan 77.

The adjacent end portions of the two parts 61 and 62 are provided with vacuum grooves functioning similar to the grooves 22 and 24 of the first described embodiment. Thus the part 61 is provided with the parallel grooves 101 connected by ducts (not shown) to a suitable vacuum line. Similarly the part 62 is provided with grooves 102. Vacuum adjusting means is provided as previously described with reference to Figure 3.

The end of each part 61 and 62 is preferably formed to provide the recess 103 that serves to accommodate the rotary part 63. The transducer tip 104 carried by the rotary part operates within the gap 106, which is spanned by the cylindrical portion of the magnetic tape. The block 107 corresponds to the block 46 of Figures 6 and 7, and provides means for preventing rotation of the cylindrical portion of the tape about its central axis. Thus the block is provided with a central groove 108 which registers with the gap 106, and with the shallow pockets 109, that are connected by ducts 111 to the vacuum line 112. The pockets 109 function in the same manner as the pocket 51 shown in Figure 9, and serve to retain portions of one edge of the magnetic tape whereby the edge is maintained in contact with the abutment shoulders 113, to thereby prevent rotation. Block 107 can be mounted in the same general manner as the block 46. Thus it is shown attached to the arm 114 which is pivoted at 116 to the base 117. Spring 118 urges the arm in one direction, and the set screw 119 can be adjusted to properly position the block in proximity with the exterior surface of the tape.

The rotary part 63 is shown carried by the shaft 121 adapted to be driven by suitable synchronous motor. The motor can be either housed within the part 61, or connected to shaft 121 by suitable means as a belt drive connected to shaft 121 by suitable means as a belt drive (not shown). Likewise shaft 121 can be associated with suitable pulse generating means as previously described. As in the first described embodiment one terminal from the transducer unit is grounded, and the other can connect through slip ring means housed in the portion 122, to provide a lead 123 extending to the record and/or playback electronics.

The embodiment illustrated in Figures 10 to 17, inclusive, operates substantially the same as the first described embodiment. In operation the tape is curved as it leaves the guide 72, and it is bent to complete cylindrical form as it progresses over the parts 61 and 62. The transducer unit sweeps across successive track areas of the tape for the recording and/or reproducing operations. After leaving the part 62 the tape is gradually flattened out, and after leaving the guide 74 it is restored to flat form as it contacts the capstan 77. The novel manner in which the idler 78 engages the capstan makes for smooth pressure between the tape and the capstan surface, thus obtaining equalized driving across the entire width of the tape. In the event one desired to make an adjustment between the overlapping margins of the magnetic tape in a direction of the length of the tape, guide 74 is adjusted a limited amount to change the tilt of this guide. The transducer tips 84 pick up a frequency depending upon the number of sweep areas per unit of tape length. Such a frequency can be used in conjunction with a pulse generator like generator 33 (Figure 1) for tape speed control. In other words the frequency picked up in this manner can be used instead of a separately recorded control frequency.

Figure 10:
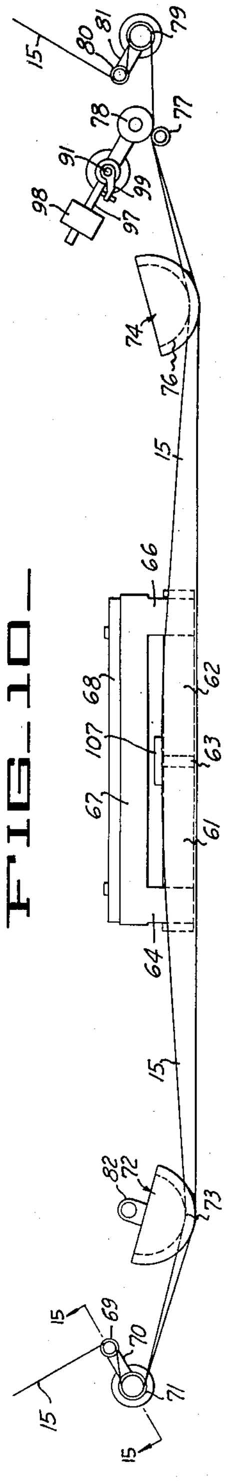
Figure 10 is a plan view illustrating another embodiment of the invention.
Figure 18:
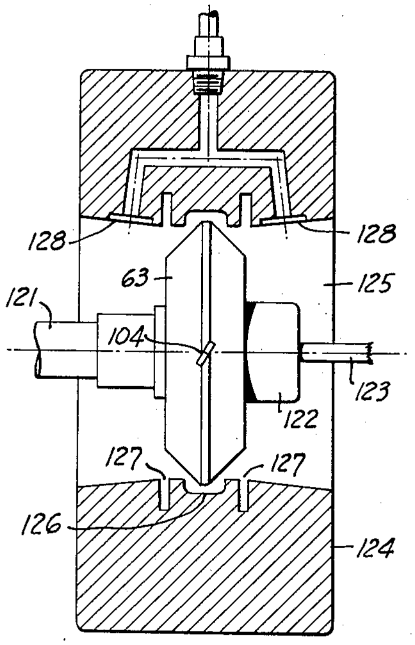
Figure 18 is a detail in section illustrating another embodiment of the invention.
Figure 19:
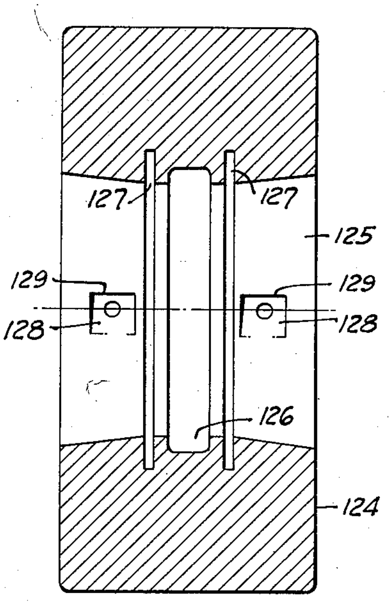
Figure 19 is a detail in section like Figure 18 but with the wheel for carrying the transducer unit, removed.

Another embodiment of the invention is shown in Figures 18 to 19, inclusive. In this instance the tape is formed to cylindrical shape by means engaging the exterior surface of the same. Thus a guide member 124 is provided which has an opening 125 through the same that is circular in section. Assuming that the tape is otherwise guided and transported as illustrated in Figure 10, the member 124 takes the place of the parts 61 and 62, whereby the tape is formed to cylindrical shape with overlapping margins. The rotary part 63 operates within the member 124, and the transducer tip 104 operates upon that portion of the tape spanning the annular recess 126. Annular grooves 127 are provided for connection to a source of partial vacuum, thereby maintaining the tape in contact with the inner periphery of the passage 125. Shallow pockets 128 are also provided, and can be shaped the same as the shallow pockets 109 of Figure 13. These pockets likewise connect to a source of partial vacuum whereby the adjacent portions of the tape are drawn within these recesses to provide abutment against the shoulders 129.

I claim:

1. In broad band magnetic tape apparatus, transport means for moving a thin flexible magnetic tape in the direction of its length, means for progressively forming a portion of the moving tape into the shape of a cylinder with overlapping edge margins, and rotary transducer means for sweeping continuously over successive track areas of the cylindrical formed portion, said means performing a magnetic record-electrical signal transducing operation.

2. Apparatus as in claim 1 in which the transducer means includes a transducer unit having a tip provided with a magnetic gap, the tip contacting the tape and moving over said sweep areas, the plane of the gap being inclined at an angle of from 25 to 45° with respect to the plane of rotation of the transducer unit.

3. Apparatus as in claim 1 together with means engaging a rectilinear edge of the tape for preventing rotation of the cylindrically formed tape portion.

4. Apparatus as in claim 1 in which said means for forming a portion of the moving tape into the shape of a cylinder comprises means disposed within said cylindrical tape portion.

5. Apparatus as in claim 1 in which said means for forming a portion of the moving tape into the shape of a cylinder comprises a holding device surrounding said cylindrical portion of the tape.

6. Apparatus as in claim 1 in which additional guide means engages portions of the tape located on the tape advancing and take-off sides of said tape forming means.

7. Apparatus as in claim 4 in which tape engaging transducer means is carried by a shaft extending within said guide means.

8. In broad band magnetic tape apparatus, transport means for moving a magnetic tape in the direction of its length, means serving to form a portion of the moving tape into the shape of a cylinder with overlapping edge margins, rotatable transducer means performing a magnetic record-electrical signal transducing operation and disposed to continuously contact and sweep across the cylindrically formed tape, separate guide means disposed on the tape advancing and take-off sides of said last named means and serving to engage the flat tape, and means for adjusting at least one of said guide means to adjust the relative positioning of the margins of the tape in the direction of the length of the tape.

9. In broad band magnetic tape apparatus, transport means for moving a magnetic tape in the direction of its length, means for progressively forming a portion of the tape in the form of a cylinder, with overlapping edge margins, said last means including cylindrical shaped parts spaced axially, rotary transducer means performing a magnetic record-electrical signal transducing operation, said means being disposed between said parts and adapted to contact and sweep across magnetic tape extending between said parts, and annular grooves formed in the periphery of said parts, and adjacent the proximate ends thereof for connection to a source of partial vacuum, said annular grooves serving as means to retain the tape in cylindrical form about said parts.

10. Apparatus as in claim 9 together with adjustable means for applying a partial vacuum to the grooves.

11. In broad band magnetic tape apparatus, transport means for moving a magnetic tape in the direction of its length, means for progressively forming a portion of the tape in the form of a cylinder with overlapping edge margins, said last means including cylindrical shaped parts spaced axially, means on one of said cylindrical shaped parts forming an abutment shoulder for engaging an edge of an overlapping margin, rotary transducer means disposed between said parts and adapted to contact and sweep across tape extending between said parts, said last means performing a magnetic record-electrical signal transducing operation.

12. Apparatus as in claim 11 together with pneumatic suction means for retaining the tape in abutting relation with said shoulder.

References Cited in the file of this patent

UNITED STATES PATENTS

| | | |
|---|---|---|
| 2,148,884 | Walter | Feb. 28, 1939 |
| 2,245,286 | Marzocchi | June 10, 1941 |
| 2,648,589 | Hickman | Aug. 11, 1953 |
| 2,809,238 | Fay | Oct. 8, 1957 |

FOREIGN PATENTS

| | | |
|---|---|---|
| 686,009 | Great Britain | Jan. 14, 1953 |